(12) United States Patent
Shin

(10) Patent No.: US 12,463,828 B2
(45) Date of Patent: Nov. 4, 2025

(54) METHOD AND DEVICE FOR INSTALLING CERTIFICATE ON BASIS OF ENCRYPTION AND DECRYPTION OF CONTRACT CERTIFICATE PRIVATE KEY

(71) Applicants: HYUNDAI MOTOR COMPANY, Seoul (KR); KIA CORPORATION, Seoul (KR); Myongji University Industry and Academia Cooperation Foundation, Yongin-si (KR)

(72) Inventor: Min Ho Shin, Yongin-si (KR)

(73) Assignees: Hyundai Motor Company, Seoul (KR); Kia Corporation, Seoul (KR); Myongji University Industry and Academia Cooperation Foundation, Yongin-si (KR)

( * ) Notice: Subject to any disclaimer, the term of this patent is extended or adjusted under 35 U.S.C. 154(b) by 315 days.

(21) Appl. No.: 18/025,452

(22) PCT Filed: Sep. 7, 2021

(86) PCT No.: PCT/KR2021/012135
§ 371 (c)(1),
(2) Date: Mar. 9, 2023

(87) PCT Pub. No.: WO2022/055222
PCT Pub. Date: Mar. 17, 2022

(65) Prior Publication Data
US 2023/0327886 A1 Oct. 12, 2023

(30) Foreign Application Priority Data
Sep. 6, 2021 (KR) .................. 10-2021-0118599

(51) Int. Cl.
H04L 9/32 (2006.01)
H04L 9/06 (2006.01)
H04L 9/08 (2006.01)

(52) U.S. Cl.
CPC .......... *H04L 9/3263* (2013.01); *H04L 9/0631* (2013.01); *H04L 9/0643* (2013.01); *H04L 9/088* (2013.01)

(58) Field of Classification Search
CPC ... H04L 9/3263; H04L 9/0631; H04L 9/0643; H04L 9/088
(Continued)

(56) References Cited

U.S. PATENT DOCUMENTS 11,316,685 B1 * 4/2022 Doherty .................... H04L 9/16
12,107,965 B2 * 10/2024 Bernsen ................ H04L 9/0643
(Continued)

OTHER PUBLICATIONS

International Search dated Dec. 13, 2021 issued in International Patent Application No. PCT/KR2021/012135 (w/ English translation).
(Continued)

*Primary Examiner* — Dant B Shaifer Harriman
(74) *Attorney, Agent, or Firm* — Morgan Lewis & Bockius LLP

(57) ABSTRACT

Disclosed are a method and device for installing a certificate on the basis of encryption and decryption of a contract certificate private key for an electric vehicle communication controller. The method for installing the certificate comprises: a step in which the electric vehicle communication controller transmits, to a secondary actor, a certificate installation request message signed with a private key associated with a manufacturer's provisioning certificate; and a step of receiving, from the secondary actor, a certificate installation response message signed with a private key associated with a leaf certificate of a certificate provisioning service,
(Continued)

wherein an encrypted private key element of the certificate installation response message stores a private key belonging to a new contract certificate which is encrypted for the electric vehicle communication controller without a trust platform module, the private key belonging to the new contract certificate is encrypted with AES-GCM-256 on the basis of an encryption key which is entered from a public key of the manufacturer's provisioning certificate and generated through an ECDH protocol, and the private key encrypted with the AES-GCM-256 is included in a ciphertext at 528-bits or 448-bits after an initial initialization vector of a contract certificate data packet.

20 Claims, 8 Drawing Sheets

(58) Field of Classification Search
USPC .......................................................... 713/171
See application file for complete search history.

(56) References Cited

U.S. PATENT DOCUMENTS

| | | | |
|---|---|---|---|
| 2013/0042112 A1* | 2/2013 | Spector | H04L 63/0428 713/171 |
| 2013/0091353 A1* | 4/2013 | Zhang | H04L 9/3268 713/156 |
| 2020/0282859 A1* | 9/2020 | Shin | B60L 53/66 |
| 2023/0327886 A1* | 10/2023 | Shin | H04L 9/0643 713/171 |

OTHER PUBLICATIONS

B. Vaidya, et al., "Multimodal and Multi-pass Authentication Mechanisms for Electric Vehicle Charing Networks," 2020 International Wireless Communications and Mobile Computing, IEEE, Jun. 19, 2020, pp. 371-376.

S. Lee, et al., "A Study on the Application of Cross-Certification Technology for the Automatic Authentication of Charging Users in ISO 15118 Standard," Society for e-Business Studies, No. 2, vol. 25, May 31, 2020, pp. 1-14 (with English translation).

S. Lee, et al., "Study on Analysis of Security Vulnerabilities and Countermeasures in ISO/IEC 15118 based Electric Vehicle Charging Technology," 2014 International Conference on IT Convergence and Security (ICITCS), IEEE, Oct. 30, 2014, pp. 1-4.

N. El Sayed, "A Prototypical Implementation of an ISO-15118-Based Wireless Vehicle to Grid Communication for Authentication over Decoupled Technologies," 2019 AEIT International Conference of Electrical and Electronic Technologies for Automotive (Aeit Automotive), IEEE, Jul. 4, 2019, pp. 1-6.

Rescorla, TLS Elliptic Curve Cipher Suites with SHA-256/384 and AES Galois Counter Mode (GCM), Network Working Group Request for Comments: 5289 Category: Informational, Aug. 2008, pp. 1-6.

Lee et al., "A Study on the Application of Cross-Certification Technology for the Automatic Authentication of Charging Users in ISO 15118 Standard", The Journal of Society for e-Business Studies, vol. 25, No. 2, May 2020, pp. 1-14, with an English abstract.

"Road vehicles-Vehicle-to-Grid Communication Interface—Part 2: Network and application protocol requirements", International Standard, ISO 15118-2, First edition, Apr. 1, 2014, Reference No. ISO 15118-2:2014(E), pp. 1-342, with cover page and table of contents.

* cited by examiner

【FIG. 1】
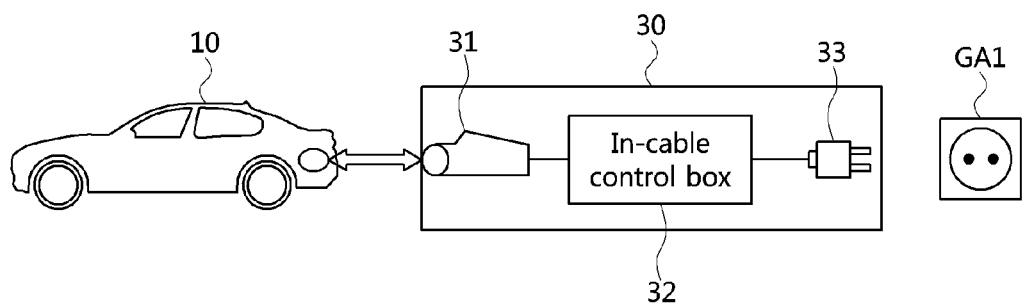
【FIG. 2】
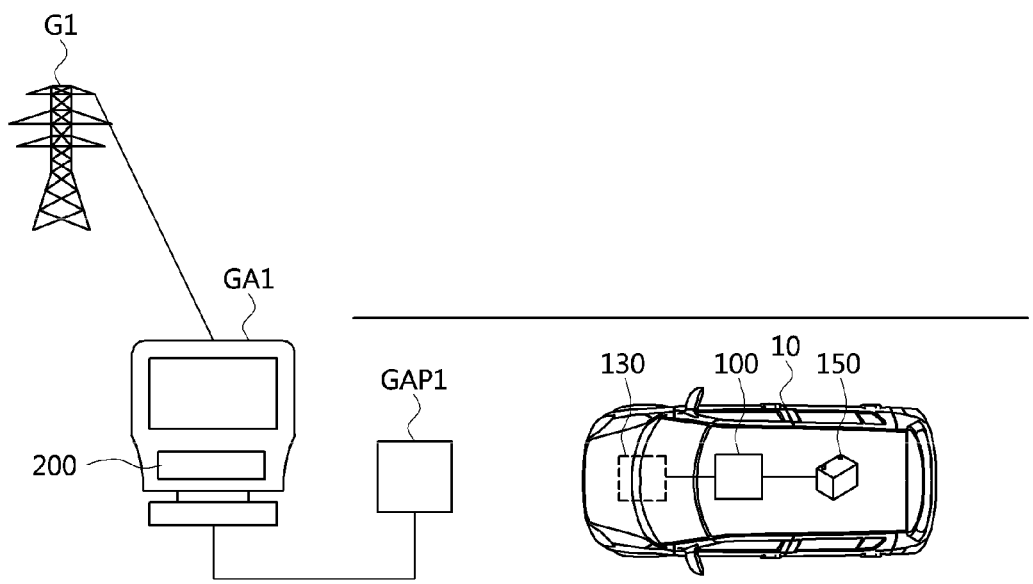

【FIG. 3】
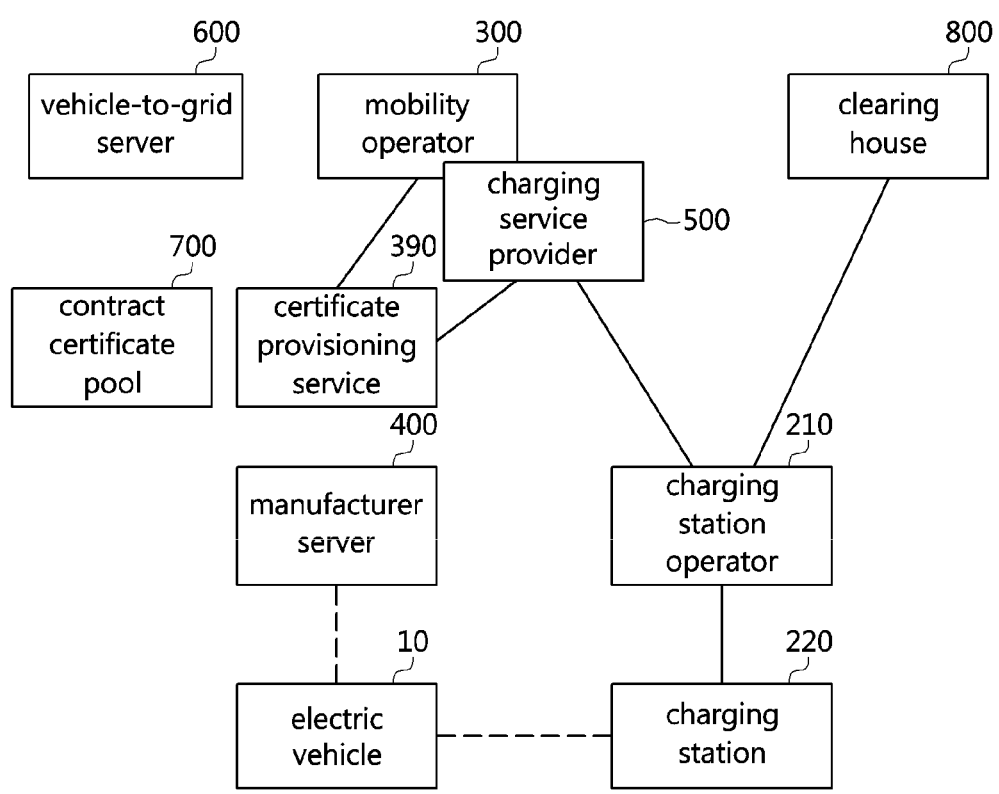

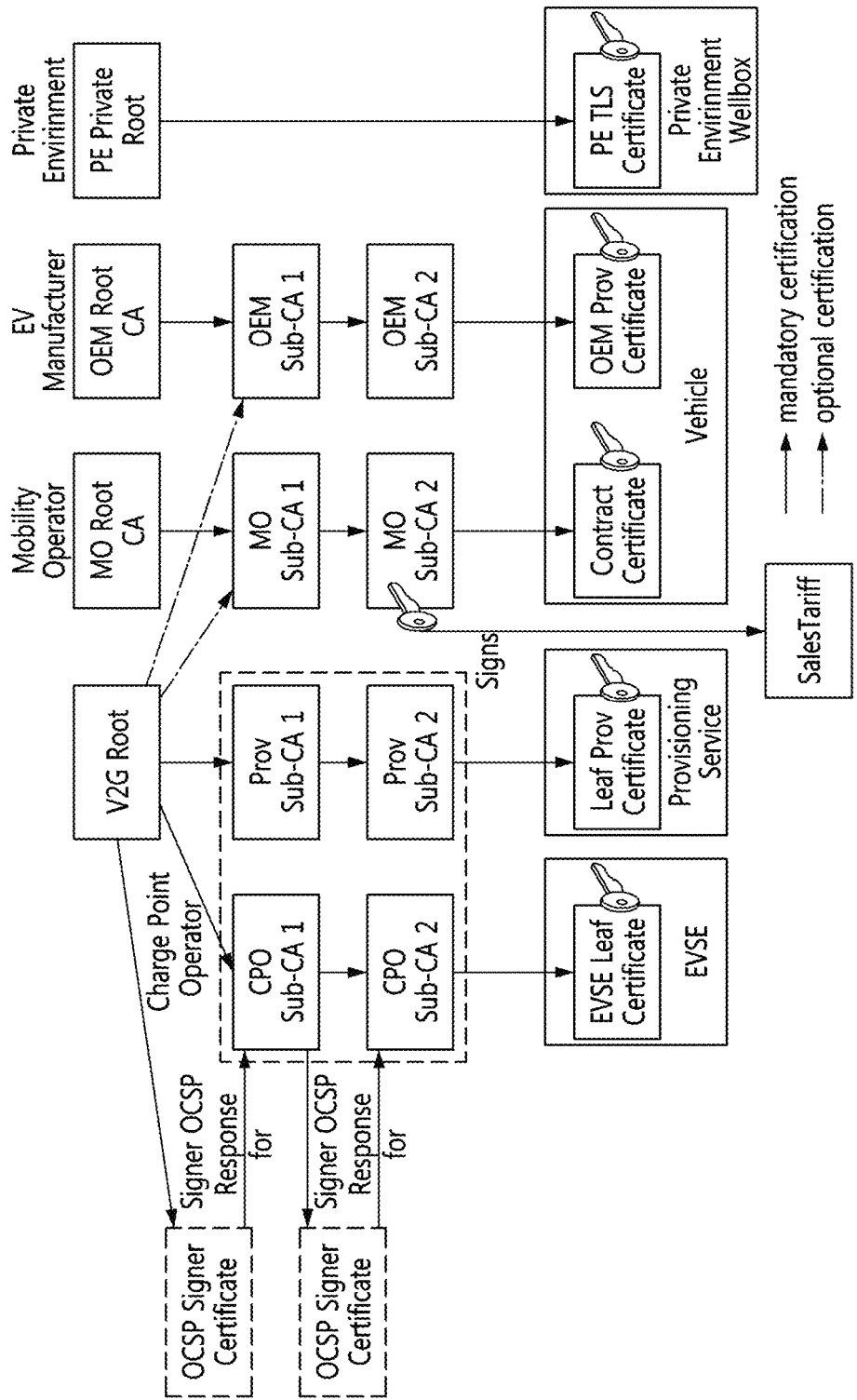
[FIG. 4]

[FIG. 5]
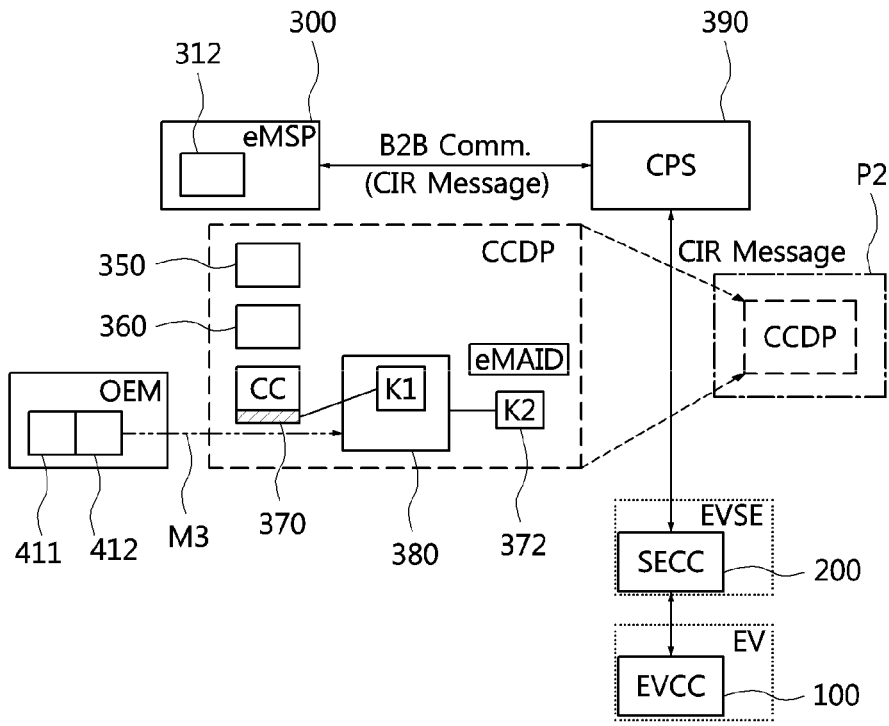
[FIG. 6]
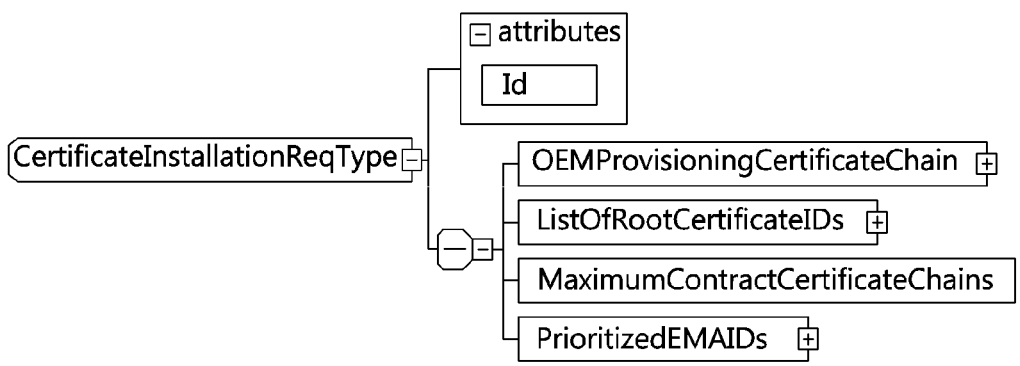

[FIG. 7]
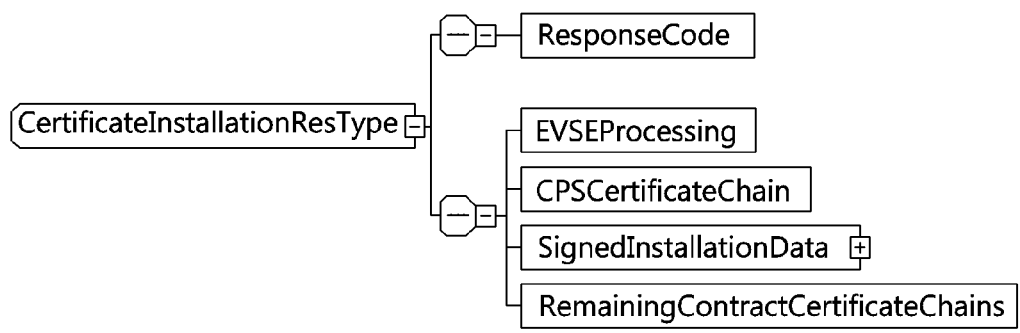
[FIG. 8]
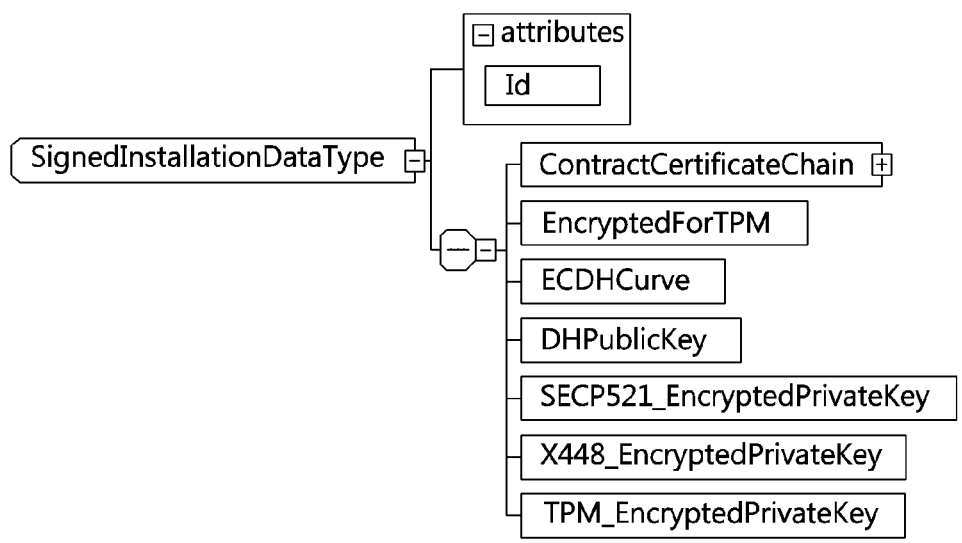

[FIG. 9A]
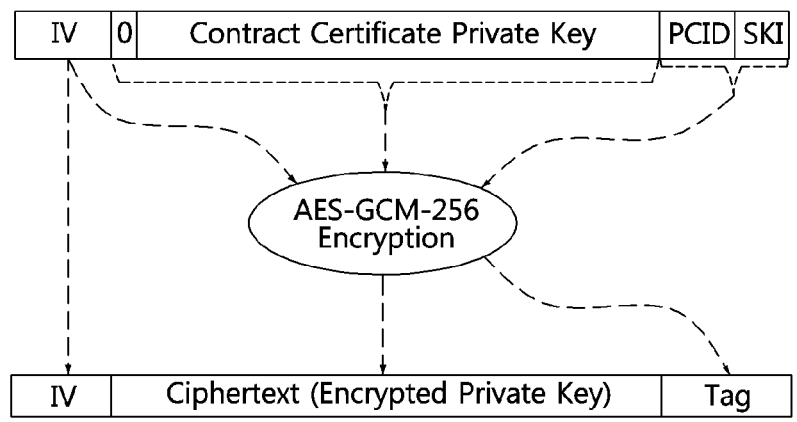
[FIG. 9B]
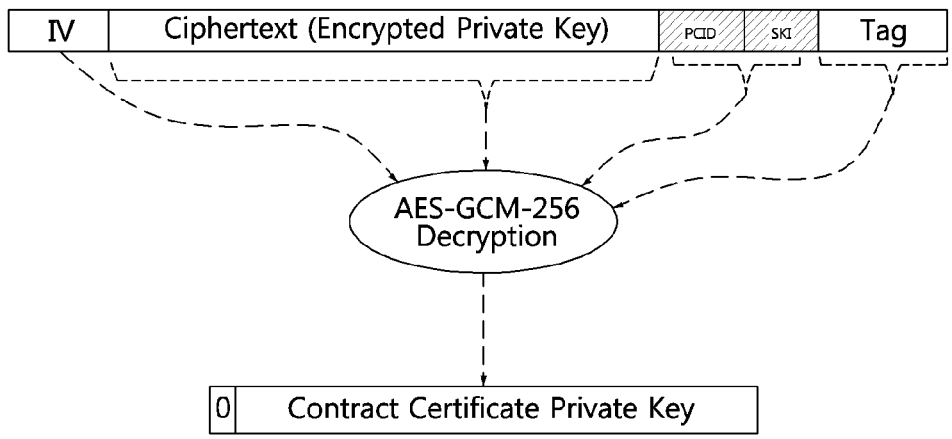

[FIG. 10A]
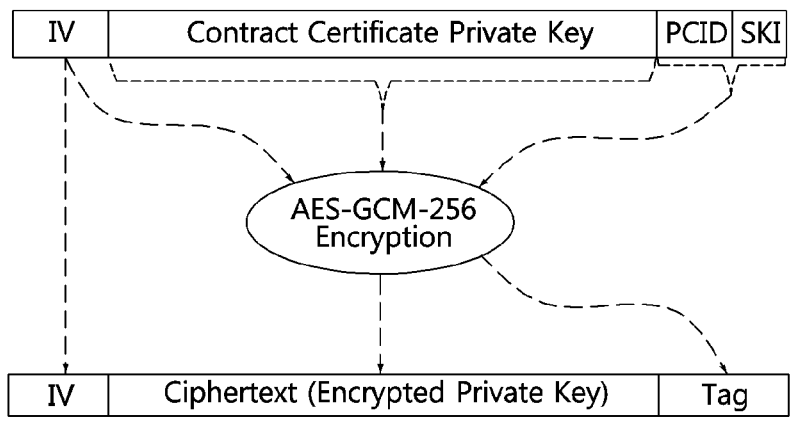
[FIG. 10B]
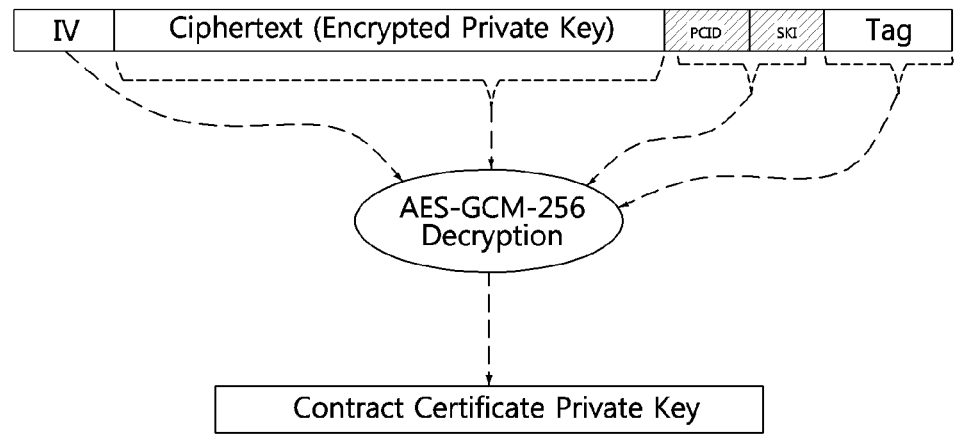

[FIG. 11]
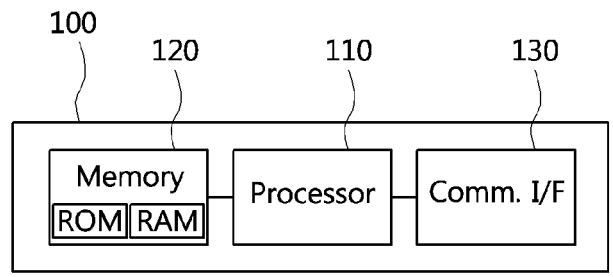
[FIG. 12]
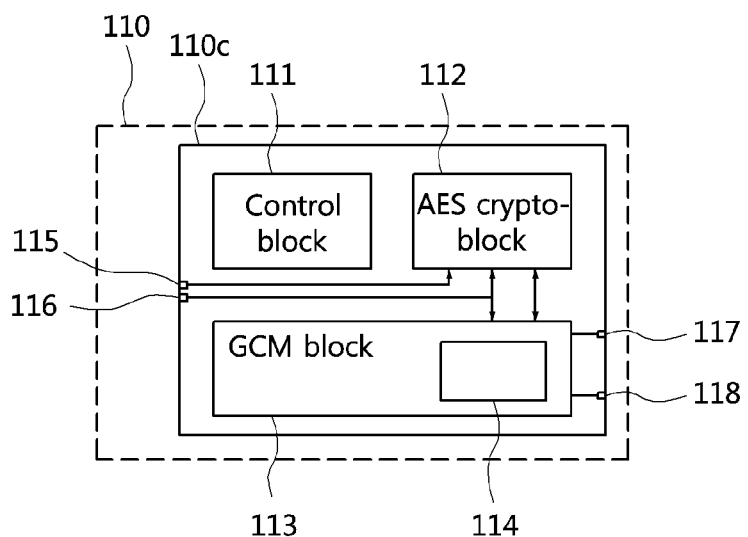
[FIG. 13]
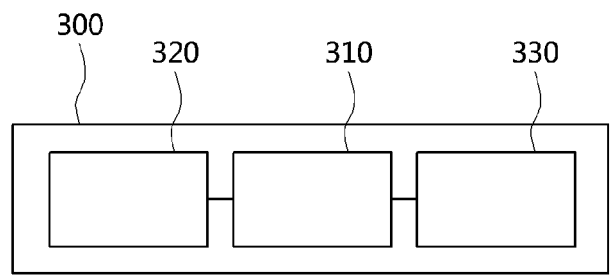

METHOD AND DEVICE FOR INSTALLING CERTIFICATE ON BASIS OF ENCRYPTION AND DECRYPTION OF CONTRACT CERTIFICATE PRIVATE KEY

CROSS-REFERENCE OF RELATED APPLICATIONS

This application is the U.S. National Phase under 35 U.S.C. § 371 of International Patent Application No. PCT/KR2021/012135, filed on Sep. 7, 2021, which claims priority to Korean Patent Application No. 10-2021-0118599, filed Sep. 6, 2021, and U.S. Provisional Patent Application Nos. 63/077,109, filed on Sep. 11, 2020 and 63/117,089, filed on Nov. 23, 2020, the disclosures of which are incorporated by reference herein in their entireties.

TECHNICAL FIELD

The present disclosure relates to a technique for installing a certification of a vehicle, and more particularly, to a method and an apparatus for installing a certificate based on encryption and decryption of a contract certificate for an electric vehicle communication controller.

BACKGROUND ART

An electric vehicle (EV) authenticates itself using an XML signature scheme defined in standards or regulations, and transfers information to the outside through a transport layer security (TLS) protocol. The information transfer is performed among an EV communication controller (EVCC) of the EV, an EV supply equipment communication controller (SECC) of an EV supply equipment (EVSE), and a secondary actor (SA).

For example, when exchanging XML-type messages among the SA, SECC, and EVCC, a sender writes a reference ID in contents of a message to be signed. The reference ID indicates what contents are being signed. Then, the sender calculates an efficient XML interchange (EXI) value of the contents to be signed with SHA256 for a signature, and puts a digest value encoded based on Base64 or the like into a digest value (DigestValue) field of a reference. Then, the sender digitally signs an XML message or a part of the XML message using a specific class (SignedInfo) and puts the signed value into a signature value (SignatureValue) field. A recipient checks whether message data has been tampered by using the value of the DigestValue field in the XML message received from the sender, and then verifies the value of the SignatureValue field.

Meanwhile, a mobility operator (MO) or an electro-mobility service provider (eMSP) needs to encrypt a contract certificate to be installed in the EV and secrete keys corresponding thereto, and deliver them to the EV. To this end, related standards or regulations recommend using elliptic curve Diffie-Hellman ephemeral (ECDHE) key exchange algorithm using elliptic curve cryptography.

For example, the MO or eMSP may use advanced encryption standard (AES)-cipher block chaining (CBC)-128 with a 128-bit initialization vector (IV) at the beginning to encrypt the contract certificate and a pair of secrete keys. The private key corresponding to the contract certificate may be encrypted using a session key derived by elliptic curve Diffie-Hellman (ECDH) protocol. The initialization vector (IV) may be randomly generated before the encryption and may have a length of 128-bits, but can never be reused. In addition, the initialization vector is transmitted as being included in the most significant 16 bytes of a specific field (e.g., ContractCertificateEncryptedPrivateKey) of a predetermined message for certificate installation.

A contract certificate data packet containing the encrypted private keys is delivered from the MO or eMSP to a certificate provisioning service (CPS). The role of the CPS may be performed by, for example, the MO or eMSP itself, an EVSE operator, or a stand-alone service provider. The CPS may convert the message received from the MO/eMSP into a format defined in standards or regulations or into a transmission format receivable by the EV, insert its own signature thereinto, and deliver it to the EV through the SECC. The signature of the CPS guarantees that the data delivered to the EVCC of the EV is authentic.

The aforementioned contract certificate data packet is transmitted from the MO to the CPS, and is transmitted from the CPS to the EVCC through the SECC together with the signature of the CPS. Here, the contract certificate data packet has a data format with an initialization vector (IV) of 128 bits, an encrypted private key of 256 bits, and a not-specifically defined field of least significant 128 bits.

Meanwhile, as the supply of EVs is rapidly progressing, the charging infrastructure for EVs is also rapidly expanding, and various studies are being conducted to provide more convenient and safe charging environments to EV users. In addition, with the development of digital communication technology, various supplementary services for EVs, such as EV remote diagnosis, EV firmware update, EV certificate update, and the like are also being studied.

However, communication technology for providing convenient functions to EV users may increase security threats at the same time. In particular, when the EVCC, SECC, and SA are connected to each other through networks such as power line communication, short-range wireless communication, cellular communication, and the Internet, it may be difficult to verify a trusted certification authority in real time, or they may be vulnerable to security threats because they may be exposed to access by unauthorized users, such as hacking of secrete keys. In this regard, although current communication related to EVs uses secure communication using a TLS and electronic signature techniques using a public key certificate and a private key to process transmission and reception message security, the security of EV-related communication is still insufficient.

As described above, there is a demand for a method for safely transmitting a message for installing a contract certificate, etc. to an EVCC that does not have a trusted platform module (TPM) in communication related to EVs, and increasing reliability of message security.

DISCLOSURE

Technical Problem

In order to satisfy the demand from the above-described prior arts, an objective of the present disclosure is to provide a method and an apparatus for installing a certificate based on encryption and decryption of a contract certificate private key for an EVCC, by which a mobility operator (MO) or an electro-mobility service provider (eMSP) can install the contract certification private key for the EVCC with high confidentiality in a vehicle-to-grid (V2G) environment.

Another objective of the present disclosure is to provide a method and an apparatus for installing a certificate based on encryption and decryption of a contract certificate private key, in which the EVCC can decrypt a private key encrypted with high confidentiality, which is received from the MO or eMSP, using the contract certificate private key in the V2G environment.

Technical Solution

A public key encryption method applicable to a certificate installation method, according to an aspect of the present disclosure for achieving the technical objective, may comprise, in a certificate installation method based on encryption and decryption of a contract certificate private key for an electric vehicle communication controller, transmitting, by the electric vehicle communication controller and to a secondary actor, a certificate installation request message signed with a private key associated with a manufacturer provisioning certificate; and receiving, from the secondary actor, a certificate installation response message signed with a private key associated with a leaf certificate of a certificate provisioning service. Here, the certificate installation response message includes a contract certificate data packet including a signed installation data element, the signed installation data element includes a contract certificate chain element and an encrypted private key element, and the encrypted private key element stores a private key belonging to a new contract certificate encrypted for the electric vehicle communication controller without a trusted platform module.

In addition, the private key belonging to the new contract certificate is encrypted using an advanced encryption standard (AES)-Galois/counter mode (GCM) based on an encryption key which is generated from the public key of the manufacturer provisioning certificate and the private key of the secondary actor through ECDH protocol, and the private key encrypted using the AES-GCM is included as a ciphertext or an encrypted private key field in 528 bits or 448 bits after a 96-bit or 128-bit initialization vector in the contract certificate data packet.

A public key encryption apparatus applicable to a certificate installation apparatus, according to another aspect of the present disclosure for achieving the technical objective, may comprise, in an apparatus for installing a certificate in an electric vehicle based on encryption and decryption of a contract certificate private key, a processor; a memory storing instructions executable by the processor; and a communication interface connected to the processor and communicating with an external apparatus through a network. When executed by the processor, the instructions cause the processor to perform: transmitting, by the electric vehicle communication controller and to a secondary actor, a certificate installation request message signed with a private key associated with a manufacturer provisioning certificate; and receiving, from the secondary actor, a certificate installation response message signed with a private key associated with a leaf certificate of a certificate provisioning service.

Here, the certificate installation response message includes a contract certificate data packet including a signed installation data element, the signed installation data element includes a contract certificate chain element and an encrypted private key element, and the encrypted private key element stores a private key belonging to a new contract certificate encrypted for the electric vehicle communication controller without a trusted platform module.

In addition, the private key belonging to the new contract certificate is encrypted using an advanced encryption standard (AES)-Galois/counter mode (GCM) based on an encryption key which is generated from the public key of the manufacturer provisioning certificate and the private key of the secondary actor through ECDH protocol, and the private key encrypted using the AES-GCM is included as a 528-bit or 448-bit ciphertext in an encrypted private key field after a 96-bit or 128-bit initialization vector in the contract certificate data packet.

A public key encryption apparatus applicable to a certificate installation apparatus, according to yet another aspect of the present disclosure for achieving the technical objective, may comprise, in an apparatus for installing a certificate in an electric vehicle based on encryption and decryption of a contract certificate private key, a processor; a memory storing instructions executable by the processor; and a communication interface connected to the processor and communicating with an external apparatus through a network. When executed by the processor, the instructions cause the processor to perform: receiving, from an electric vehicle communication controller; a certificate installation request message signed with a private key associated with a manufacturer provisioning certificate; and transmitting, to the electric vehicle communication controller, a certificate installation response message signed with a private key associated with a leaf certificate of a certificate provisioning service. The certificate installation response message includes a contract certificate data packet including a signed installation data element, the signed installation data element includes a contract certificate chain element and an encrypted private key element, and the encrypted private key element stores a private key belonging to a new contract certificate encrypted for the electric vehicle communication controller without a trusted platform module, and In addition, the private key belonging to the new contract certificate is encrypted using an advanced encryption standard (AES)-Galois/counter mode (GCM) based on an encryption key which is generated from the public key of the manufacturer provisioning certificate and the private key of the secondary actor through ECDH protocol, and the private key encrypted using the AES-GCM is included as a 528-bit or 448-bit ciphertext after a 96-bit or 128-bit initialization vector in the contract certificate data packet.

Advantageous Effects

According to the present disclosure, when a private key used in AES has a short length of 128 bits, a problem in which the private key can be predicted relatively easily by an attacker due to low confidentiality when the private key is generated by a random number generator can be resolved.

That is, according to the present disclosure, the contract certificate private key transmitted from the MO or eMSP to the EVCC in a V2G environment can be encrypted or decrypted with high confidentiality, thereby increasing the reliability and stability of EV-related communication security.

In addition, according to the present disclosure, since the SA can deliver the contract certificate private key to the EVCC with high confidentiality, there is an advantage of increasing the overall reliability of confidentiality, integrity, availability, and authenticity, which are main factors required for EV-related communication security, with respect to various messages related to EV charging or automatic authentication, for example, approval request, charge amount confirmation request, and charging parameter discovery response messages as well as a certification installation request or certification installation response message.

DESCRIPTION OF DRAWINGS

FIG. 1 is a conceptual diagram for describing an EV wired charging structure related to a certificate installation method based on encryption and decryption of a contract certification private key for an EVCC according to an exemplary embodiment of the present disclosure.

FIG. 2 is a conceptual diagram for describing an EV wireless power transfer structure related to a certificate installation method according to an exemplary embodiment of the present disclosure.

FIG. 3 is a schematic block diagram of an EV charging infrastructure related to a certificate installation method according to an exemplary embodiment of the present disclosure.

FIG. 4 is an exemplary diagram illustrating an example of a PKI-based certificate hierarchy structure related to a certificate installation method according to an exemplary embodiment of the present disclosure.

FIG. 5 is a conceptual diagram illustrating a certificate installation method according to an exemplary embodiment of the present disclosure.

FIGS. 6 to 8 are diagrams for describing certificate installation related messages that can be employed in the certificate installation method of FIG. 5 in more detail.

FIGS. 9A and 9B are diagrams for describing encryption and decryption processes of an SECP521-based encrypted private key applicable to the certificate installation method of FIG. 5.

FIGS. 10A and 10B are diagrams for describing encryption and decryption processes of an X448-based encrypted private key applicable to the certificate installation method of FIG. 5.

FIG. 11 is a schematic block diagram of a certificate installation apparatus based on encryption and decryption of a contract certificate private key for an EVCC (hereinafter referred to simply as a 'certificate installation apparatus') according to another exemplary embodiment of the present disclosure.

FIG. 12 is a block diagram of an AES-GCM core applicable to the certificate installation apparatus of FIG. 11.

FIG. 13 is a schematic block diagram of a certificate installation apparatus according to another exemplary embodiment of the present disclosure.

MODES OF THE INVENTION

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Additional terms used in the present specification are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be a four or more wheeled vehicle manufactured for use primarily on public streets or roads.

The EV may include an electric vehicle, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An EV that recharges the on-vehicle primary battery by connecting to the power grid.

"Wireless power charging system (WCS)": The system for wireless power transfer and control between the GA and VA including alignment and communications. This system transfers energy from the electric supply network to the electric vehicle electromagnetically via a two-part loosely coupled transformer.

"Wireless power transfer (WPT)": The transfer of electrical power from the alternating current (AC) supply network to the electric vehicle without contact.

"Utility": A set of systems which supply electrical energy and may include a customer information system (CIS), an advanced metering infrastructure (AMI), rates and revenue system, etc. The utility may provide the EV with energy based on a rates table and discrete events. Additionally, the utility may provide information about certification of EVs, interval of power consumption measurements, and a tariff.

"Smart charging": A system in which EVSE and/or PEV communicate with power grid to optimize charging ratio or discharging ratio of EV by reflecting capacity of the power grid or expense of use.

"Interoperability": A state in which components of a system interwork with corresponding components of the system to perform operations aimed by the system. Additionally, information interoperability may refer to capability that two or more networks, systems, devices, applications, or components may efficiently share and easily use information without causing inconvenience to users.

"Inductive charging system": A system transferring energy from a power source to an EV via a two-part gapped core transformer in which the two halves of the transformer, i.e., primary and secondary coils, are physically separated from one another. In the present disclosure, the inductive charging system may correspond to an EV power transfer system.

"Inductive coupling": Magnetic coupling between two coils. In the present disclosure, coupling between the GA Coil and the VA Coil.

"Original equipment manufacturer (OEM)": An EV manufacturer or a server operated by the EV manufacturer. It may include a root certification authority (CA) or a root certification server that issues an OEM root certificate.

"Power grid operator (V2G operator)": A primary actor participating in V2G communication using a transmission protocol, or an entity for initiation of a blockchain for automatic authentication of an EV or EV user and creation of a smart contract on the blockchain. It may include at least one trusted certification authority or trusted certification server.

"Charging service operator (or, mobility operator (MO))": One of entities within a PnC architecture that have a contractual relationship with an EV owner regarding charging, approval, and payment to enable an EV driver to charge an EV battery at a charging station. It may include at least one certification authority or certification server that issues and manages its own certificate. The charging service operator may be referred to as a mobility operator.

"Charge service provider (CSP)": An entity responsible for managing and authenticating a credential of an EV user, and performing a role of providing billing and other value-added services to customers. It may correspond to a special type of MO, and may be implemented in a combined form with MO.

"charging station (CS)": A facility or device that has one or more EV supply equipment and actually performs charging of an EV.

"Charging station operator (CSO)": An entity that is connected to a power grid and manages power in order to supply power requested by an EV. It may be a term of the same concept as a charge point operator (CPO) or an e-mobility service provider (eMSP), or it may be a term of a concept included in the CPO or eMSP or including the CPO or eMSP. The CSO, CPO or eMSP may include at least one certification authority that issues or manages its own certificate.

"e-mobility authentication identifier (eMAID)": A unique identifier that links a contract certificate to a payment account of an owner of an electromobility that uses electricity. In exemplary embodiments, the mobility authentication identifier may include an identifier of an EV certificate or an identifier of a provisioning certificate. The term eMAID may be replaced to refer to 'e-mobility account identifier' or may be replaced with a contract ID.

"Clearing house (CH)": An entity that handles cooperation matters between MOs, CSPs, and CSOs. It can act as an intermediary that facilitates approval, billing, and adjustment procedures for EV charging service roaming between two parties.

"Roaming": Information exchanges and a scheme and provisions between CSPs, which allows EV users to access the charging services provided by multiple CSPs or CSOs pertaining to multiple e-mobility networks by using a single credential and contract.

"Credential": A physical or digital asset representing an identity of an EV or EV owner, and may include a password used to verify the identity, a public key and private key pair used in a public key encryption algorithm, a public key certificate issued by a certification authority, information related to a trusted root certification authority.

"Certificate": An electronic document binding a public key to an ID by a digital signature.

"Service session": A collection of services around a charge point related to the charging of an EV assigned to a specific customer in a specific timeframe with a unique identifier.

Hereinafter, exemplary embodiments of the present disclosure will be explained in detail by referring to accompanying figures.

A certificate installation method based on encryption and decryption of a contract certificate private key for an EVCC according to an exemplary embodiment (hereinafter simply referred to as a 'certificate installation method') may include a process in which a secondary actor (SA) connected to an SECC of a charging station through a wired or wireless link transmits a contract certificate and a private key to an EV connected to the SECC.

FIG. 1 is a conceptual diagram for describing an EV wired charging structure related to a certificate installation method according to an exemplary embodiment of the present disclosure.

As shown in FIG. 1, an EV wired charging may be performed by connecting an electric vehicle (hereinafter referred to as 'EV') 10 to a power supply circuit of a charging station through a charging cable 30.

The EV 10 may be defined as an automobile that supplies power supplied from a rechargeable energy storage device such as a battery as an energy source for an electric motor, which is a power unit. The EV 10 may be a hybrid vehicle having both an electric motor and a general internal combustion engine, and may be a motorcycle, cart, scooter, or electric bicycle as well as an automobile.

The EV 10 may have a vehicle inlet connectable to a vehicle connector of the charging cable 30. The vehicle inlet provided in the EV 10 may support slow charging, fast charging, or both slow charging and fast charging.

In addition, the EV 10 may include an on-board charger to support slow charging or charging through AC power supplied from a general power system. During slow charging, the on-board charger boosts the AC power supplied by wire from the outside, converts it into DC power, and supplies it to a battery built in the EV 10. On the other, when DC power for fast charging is supplied to the vehicle inlet, the DC power may be supplied and charged to the battery without passing through the on-board charger.

Meanwhile, the charging cable 30 may include a charging connector 31 and a plug 33 or may further include an in-cable control box (ICCB) 32.

The charging connector 31 is a connection part that can be electrically connected to the EV 10, and the plug 33 may be connected to a socket-outlet 40 of a charging device or a power supply device of the charging station. The socket-outlet 40 refers to a connection point between the charging device of the charging station and the plug 33 or the vehicle inlet, but the present disclosure is not limited thereto, and the socket-outlet 40 may mean a connection point between the plug or charging cable 30 and a charging device installed in various places. For example, the socket-outlet 40 may mean a wall jack, etc. installed in a charging facility such as a garage or parking lot belonging to the home of the owner of the EV 10, a parking area allocated for EV charging at a gas station, or a parking area at a shopping center or workplace, as well as a commercial charging station facility.

The ICCB 32 may communicate with the EV 10 to receive state information of the EV or control power charging to the EV 10. The ICCB32 may be installed in a form of being integrated in the charging cable 30, but is not limited thereto, and may be connected to a power supply circuit (not shown) that supplies power to the EV 10 from the charging station or disposed in the power supply circuit.

The ICCB 32 may correspond to a supply equipment communication controller (SECC) to be described later. The EV 10 and the ICCB 32 may be connected to each other through power line communication, and the ICCB 32 and the secondary actor may be connected to each other through at least one of wired and wireless communication networks.

FIG. 2 is a conceptual diagram for describing an EV wireless power transfer structure related to a certificate installation method according to an exemplary embodiment of the present disclosure.

As shown in FIG. 2, wireless power transfer (WPT) for an EV may be defined as a process of transferring an electrical energy of a supply network from a supplier-side device to a consumer-side device through a magnetic field in a state of magnetic induction or magnetic resonance without current flow through a galvanic connection. The wireless power transfer may be used to charge a battery 150 of the EV 10 by transferring power from a charging station (GA1) to the EV 10.

The EV 10 may include a reception pad 130 having a reception coil for wirelessly receiving an electromagnetic energy from a transmission pad GAP1 of the charging station GA1. The reception coil of the reception pad 130 receives a magnetic energy from a transmission coil of the transmission pad GAP1 of the charging station GA1 by electromagnetic induction or magnetic resonance. The magnetic energy received by the EV 10 is converted into an induced current, and the induced current is rectified into a DC current and then used to charge the battery 150.

The charging station GA1 may receive power from a commercial power grid G1 or a power backbone and supply energy to the EV 10 through the transmission pad GAP1. An EV supply equipment (EVSE) corresponding to the charging station GA1 may be located in various places such as a garage or parking lot belonging to the home of the owner of the EV 10, a parking area for EV charging at a gas station, or a parking area at a shopping center or office building.

The charging station GA1 may communicate with a power infrastructure management system or infrastructure server that manages the power grid G1 through wired/wireless communication. In addition, the charging station GA1 may perform wireless communication with the EV 10.

The wireless communication may include wireless LAN (WLAN) communication based on Wi-Fi according to the IEEE 802.11 protocols, and may also include P2PS communication using a low frequency (LF) magnetic field signal and/or a low power excitation (LPE) signal. The wireless communication between the charging station GA1 and the EV 10 may include one or more of various communication schemes such as Bluetooth, Zigbee, and cellular.

In addition, the EV 10 and the charging station GA1 may perform a charging process by exchanging messages according to an extensible markup language (XML) or an efficient XML interchange (EXI) based data expression format. That is, communication for the charging process may be performed between an EVCC and a supply equipment communication controller (SECC) through a wireless LAN or the like.

During a communication process for the charging process, the EV may first verify an identity of the charging station to identify whether it is a trusted facility, and establish a secure channel with the charging station to protect communication from unauthorized access. The secure channel may be established by a transport layer security (TLS). A TLS session may be performed according to a TLS session establishment procedure after an Internet protocol (IP)-based communication connection establishment procedure.

Meanwhile, in a certificate installation method according to an exemplary embodiment, the secure channel is established based on an electric vehicle charging infrastructure and a certificate of a main entity of the infrastructure. To this end, the electric vehicle charging infrastructure and a public key infrastructure (PKI)-based certificate hierarchy that can be employed in the exemplary embodiment will be described as follows.

FIG. 3 is a schematic block diagram of an EV charging infrastructure related to a certificate installation method according to an exemplary embodiment of the present disclosure.

As shown in FIG. 3, the electric vehicle charging infrastructure is for providing a charging service to the EV 10, and may include a charging station operator (CSO) 210, a charging station (CS) 220, a mobility operator (MO) 300, a certificate provisioning service (CPS) 390, an EV original equipment manufacturer (OEM) server 400, a charge service provider (CSP) 220, a vehicle-to-ground (V2G) server 600, a contract certificate pool (CCP) 700, and a clearing house (CH) 800.

The EV 10 refers to a general vehicle owned by an EV owner, and may be charged wired or wirelessly at the charging station. A unique OEM provisioning certificate may be installed in the EV 10 during a manufacturing process. In addition, when a contract with the operator of the MO 300 is concluded, such as a vehicle purchase contract, a contract certificate may be installed in the EV 10. In addition, a root certificate of the V2G server 600 may be installed in the EV 10.

The EV manufacturer (i.e., OEM) server 400 (hereinafter abbreviated as 'OEM') is a root certification authority (CA) that issues an OEM root certificate, and also operates and manages its subordinate certification authorities (OEM SubCA 1, OEM SubCA 2). When the EV 10 is manufactured, the OEM 400 may create an OEM provisioning certificate using an OEM intermediate chain certificate (OEM SubCA 2 cert.) and install it in the EV 10.

The MO 300 is a service provider that has a contractual relationship with the EV user for charging, approval, and payment so that the EV user can charge the EV 10 at the charging station 200. In order for the EV 10 to receive a charging service from the charging station 220, the charging station 220 needs to belong to the MO 300 or support a roaming scenario. The MO 300 may be operated by an electricity supplier or electricity wholesaler that sells energy. The MO 300 also functions as a root CA that issues an MO root certificate. An MO certificate chain, which consists of the MO root certificate and MO intermediate chain certificates created by its subordinate CAs, may be used when creating the contract certificate. In addition, the MO certificate chain may be used to verify the contract certificate installed in the EV 10 in a non-roaming environment or a roaming environment. The MO may be referred also to as an 'e-mobility service provider (eMSP)'.

In a process of installing or updating the contract certificate in the EV 10, the CPS 390 may provide an encryption key and the like used for transmission/reception of the certificate to the EV 10 or a client together with the contract certificate. The CPS 390 may have a leaf provisioning certificate (Leaf Prov cert.) and provisioning intermediate chain certificates (Prov SubCA 1 cert., Prov SubCA 2 cert.). When the contract certificate is installed or updated in the EV 10, the CPS 390 may provide a provisioning service for providing a public key of each MO, a Diffie Hellman (DH) public key, and an e-Mobility authentication identifier (eMAID) together with the contract certificate chain, thereby allowing the EV 10 to use them to verify the contract certificate chain and verify the integrity and authenticity of the contract certificate.

The CCP 700 temporarily stores a response message for certificate installation or update while the contract certificate is installed or updated in the EV 10. Considering that an installation and update timeout is very short and strict, the response message may be stored in the CCP 700 in advance and maintained until the certificate installation or update is completed. Since there may be several EVs where the contract certificates are installed or updated, the response messages may be maintained in a form of a directory after reference numbers are assigned thereto.

The V2G server 600 (hereinafter, referred to as 'V2G') may operate as a root CA in relation to the public key infrastructure (PM) in the electric vehicle charging infrastructure. Accordingly, the V2G 600 serves as a root trust anchor, and all actors shown in FIG. 3 may regard the V2G root CA as a trusted organization.

The CS 220 may actually perform charging to the EV 10. The CS 220 may include at least one wired charger and/or wireless charging spot. One or more CSs 220 may be installed in a commercial specialty charging facility. In addition, the CS 220 may be located in various places, such as a garage or parking lot belonging to the home of the EV user, a parking area for EV charging at a gas station, or a parking area a shopping center or workplace. The CS 220 may be referred to as a 'charging point', 'EV charging station', 'EV charging point', 'charging point', 'EV charging station (ECS)', or 'electric vehicle supply equipment (EVSE)'.

The CSO 210 or a charge point operator (CPO) manages operations of the charging station and electricity to provide requested energy transmission services. The CSO 210 may be operated by, for example, a charging station manufacturer, an EVSE manufacturer, or an electricity supplier. In connection with the PM, the CSO 210 may operate subordinate CAs (CPO SubCA 1, CPO SubCA 2) for creating an SECC leaf certificate for each charging station 220.

The CSP 500 manages and authenticates a credential of the EV user, and provides billing and other value-added services to customers. The CSP 500 may be considered to correspond to a special type of MO, and may be implemented in a combined form with the MO 300. A plurality of CSPs 500 may exist, each CSP may be associated with one or more CSOs 210, and the CSP 500 and one or more CSOs 210 may constitute one charging network.

That is, when the contract certificate is installed, the EV 10 may receive a charging service from the CSO 210 associated with the CSP 500 linked to the MO 300 having the contractual relationship in a plug and charge or a park and charge (PnC) scheme. However, roaming is required if the EV 10 wants to receive a charging service from a CSO associated with an MO that is not in a contractual relationship. Each CSP 500 may exchange information with other CSPs or CSOs in other networks for roaming, and may also exchange information with the CH 800.

The CH 800 handles cooperation matters between a plurality of MOs 300 and a plurality of CSPs 500. The CH 800 may perform a role of an intermediary that facilitates the approval, billing, and adjustment procedures for EV charging service roaming between two adjustment or payment parties.

That is, when the EV user wants to charge the EV at a charging station that does not belong to the network of the MO 300 with which the EV user has a contractual relationship, the CH 800 may connect to the CSO 210 or the CSP 500 to support roaming. In a situation where roaming is required, the CH 800 may allow the CSO 210 or CSP 500 to contract with the MO 300 and deliver approval and billing data to the MO 300. The CH 800 may be referred to as a 'contract clearing house (CCH)', 'mobility clearing house (MCH)', 'roaming platform', 'e-mobility clearing house (E-MOCH), or the like.

Although the aforementioned 'charging service operator (CSO)', 'certificate provisioning service (CPS)', 'mobility operator (MO)', 'contract clearing house (CCH)', and 'V2G' may appear to refer to people or organizations of people, these entities in the present disclosure, including the claims, may be implemented in hardware, software, and/or combinations thereof, and these terms are given as short and functional names to enhance readability. In an exemplary embodiment, these components may be a server apparatus implemented as a combination of hardware and software and allowing access by other devices over a network such as the Internet. In addition, since these components are functionally divided, two or more of them may be executed within one physical device or may be integrated into one program. In particular, a single entity may serve as both CSO and CSP, and another single entity may serve as both CPS and CCP. Meanwhile, one or more of the components may be rearranged to have different appearances and names.

Meanwhile, the EV charging service and related infrastructure are fields in which various industrial fields such as automobiles, power grids, energy, transportation, communication, finance, and electronic products are combined, and standardization works have been carried out in parallel from various perspectives. Further, since standardizations in individual countries have also been carried out as well as standardizations in multiple international standardization organizations, there are many terms with similar concepts. In particular, a charging station operator (CSO) has commonalities with a charge point operator (CPO) in terms of roles and functions, and although there may be some functional and nuanced differences, they may be terms referring to substantially the same entity. In addition, a charging service provider (CSP) has at least a part in common with a mobility operator (MO) in terms of roles and functions, and may be terms that can be used interchangeably or interchangeably. In interpreting the present disclosure, including the claims, such circumstances of reality should be considered.

In the electric vehicle charging infrastructure shown in FIG. 3, the PM is used for secure communication such as a PnC procedure or message transmission/reception between the entities. The PM provides a framework for verifying identities of people and devices, enabling confidential communication, and ensuring controlled access to resources.

FIG. 4 is an exemplary diagram illustrating an example of a PKI-based certificate hierarchy structure related to a certificate installation method according to an exemplary embodiment of the present disclosure.

As shown in FIG. 4, an EV manufacturer (hereinafter referred to as 'OEM') may act as a root CA that issues an OEM root certificate (OEM RootCA cert.), and may also operate subordinate CAs (OEM SubCA 1, OEM SubCA 2). Accordingly, the OEM may create OEM intermediate chain certificates (OEM SubCA 1 cert. cert., OEM SubCA 2 cert.) by signing with its own private key as well as the OEM root certificate (OEM RootCA cert.).

When the EV is manufactured, the OEM's secondary intermediate CA (OEM SubCA 2) may use a private key paired with a public key contained in the OEM secondary intermediate chain certificate (OEM SubCA 2 cert.) to create an OEM provisioning certificate (OEM Prov cert.) and install it in the EV. The OEM provisioning certificate (OEM Prov cert.) may be used to verify a signature of a request message during a certificate installation request process for the EV, uniquely identifying the EV throughout a life of the EV.

The MO may also acts as a root CA that issues an MO root certificate (MO RootCA cert.). The MO may create a primary intermediate chain certificate (MO SubCA 1 cert.) by adding its own signature to an ID and a public key of a primary subordinate CA (MO SubCA 1). The primary subordinate CA (MO SubCA 1) may create a secondary intermediate chain certificate (MO SubCA 2 cert.) by adding its own signature to an ID and a public key of a secondary subordinate CA (MO SubCA 2).

When the EV is shipped from the manufacturer, based on a contract concluded between the MO and the EV user, the secondary subordinate CA (MO SubCA 2) of the MO may create a contract certificate by using a private key paired with a public key included in the MO secondary intermediate chain certificate (MO SubCA 2 cert.), and install it in the EV through an SECC of an EVSE of a charging station that the EV first visits. The contract certificate may be linked to the EV user's payment account through a unique identifier called an e-mobility account identifier (eMAID).

The OEM provisioning certificate (OEM Prov cert.) and the contract certificate (Contract Certificate) may be created respectively based on the root certificates (OEM RootCA cert., MO RootCA cert.) created by the OEM and MO themselves, and may also be created based on a global root certificate (V2G RootCA cert.). They may be independent of certificates used by other actors. However, as indicated by a dashed line in FIG. 3, the OEM provisioning certificate (OEM Prov cert.) and contract certificate (Contract Certificate) may be created using the V2G root certificate (V2G RootCA cert.) instead of the root certificates (OEM RootCA cert., MO RootCA cert.) of the OEM and MO.

The V2G server (hereinafter referred to as 'V2G') may support to create at least two series of certificates: a certificate series for the SECC of the CSO (corresponding to 'CPO' as mentioned above) and the charging station, and a certificate series for the provisioning service.

More specifically, the V2G may create a primary intermediate chain certificate (CPO SubCA 1 cert.) by adding its own signature to an ID and a public key of the primary subordinate CA of the CPO (CPO SubCA 1). The primary subordinate CA of the CPO (CPO SubCA 1) may create a secondary intermediate chain certificate (CPO SubCA 2 cert.) by adding its own signature to an ID and a public key of the secondary subordinate certificate CA (CPO SubCA 2). The secondary subordinate CA of the CPO (CPO SubCA 2) may create an SECC leaf certificate using a private key paired with a public key included in the secondary intermediate chain certificate of the CPO (CPO SubCA 2 cert.), and transmit it to the SECC of the EVSE, thereby allowing it to be installed. This SECC leaf certificate may be used by the EV during TLS communication establishment to verify that the EV is communicating with a real charging station not a fake charging station. This certificate may be stored not only in the SECC but also in a backend server of the CSO.

In addition, the V2G may create a primary intermediate chain certificate (Prov SubCA 1 cert.) by adding its own signature to an ID and a public key of a provisioning primary subordinate CA (Prov SubCA 1). The provisioning primary subordinate CA (Prov SubCA 1) may create a secondary intermediate chain certificate (Prov SubCA 2 cert.) by adding its own signature to an ID and a public key of a provisioning secondary subordinate CA (Prov SubCA 2). The provisioning secondary subordinate CA (CPO SubCA 2) may create a leaf provisioning certificate (Leaf Prov Certificate) using a private key paired with a public key included in the provisioning secondary intermediate chain certificate (Prov SubCA 2 cert.), and may transmit it to the CPS, thereby allowing it to be installed.

Meanwhile, each root CA (V2G RootCA, MO RootCA, OEM RootCA) and each subordinate CA may issue an online certificate status protocol (OCSP) certificate and provide it to clients such as EVs. That is, clients such as EVs may access an OCSP server according to an OCSP, request revocation/non-revocation status information regarding validity of the certificates, and receive an inquiry result.

In FIG. 4, in order to simplify the expression, it is illustrated that an OCSP signer certificate by a specific signer is available only for the CPO subordinate CAs (CPO SubCA 1 and CPO SubCA 2), but the OCSP certificate may be issued and provided to all root CAs (V2G RootCA, MO RootCA, OEM RootCA), so that they can check the validity for certificates belonging to a series of its own root certificate.

In addition, in the present exemplary embodiments, it is exemplified to confirm or verify a certificate in one of three available schemes. In the first scheme, a recipient of a certificate may decrypt a signature value in the certificate with a public key in the certificate to restore a hash, and compare the restored hash with a hash included in the certificate to verify the integrity of the certificate. In the second scheme, a recipient of a certificate may verify the integrity and reliability of the certificate by sequentially comparing owner information of each certificate with issuer information of the subordinate CA thereof from a root certificate to a leaf certificate within a certificate chain. In the third scheme, a recipient of a certificate may check whether the certificate is revoked through a certificate revocation list (CRL) received from a root CA for the certificate, or check a status of the certificate by inquiring an OCSP server associated with the root CA to verify the validity of the certificate.

Hereinafter, a process in which the secondary actor installs the contract certificate in the EVCC through encryption and decryption of the private key of the contract certificate in the environment based on the above-described wired or wireless EV charging infrastructure and the public key-based certificate hierarchy will be described in detail.

FIG. 5 is a conceptual diagram illustrating a certificate installation method according to an exemplary embodiment of the present disclosure.

As shown in FIG. 5, the certificate installation method of the present exemplary embodiment may include a process in which a secondary actor (SA) such as an eMSP 300 encrypts a contract certificate private key to install a contract certificate (CC) in an EVCC that does not include a TPM 2.0.

That is, in order to minimize a distribution route and a communication processing time and for simplified structural processing, the SA may generate a key pair for a certificate, create its own certificate using the key pair, and distribute the created contract certificate and the corresponding private key to the EVCC 100. To maintain confidentiality of the contract private key, a secure mechanism may be used for the secure transmission of the contract certificate private key.

The contract certificate (CC) may include a certificate (Sub-CA 1 certificate) 350 issued for the EVCC 100 by an eMSP primary subordinate CA of the eMSP 300 and/or a certificate (Sub-CA 2 certificate) 360 issued for the EVCC 100 by an eMSP secondary subordinate CA of the eMSP 300. The contract certificate may be used for singing an XML on an application layer to verify a signature generated by the EVCC 100.

The public key belonging to the contract certificate (hereinafter referred to simply as 'contract public key') 370 may be used to encrypt the contract private key for security when the contract certificate and the contract private key are distributed from the SA such as the eMSP 300 to the EVCC 100. That is, in the encryption of the contract certificate, the private kay paired with the public key (i.e., contract public key) 370 included in the root certificate 312 of the SA or eMSP 300, or included in the eMSP primary subordinate CA certificate 350 or the eMSP secondary subordinate CA certificate 360.

In addition, in the encryption of the contract certificate private key, that is, the contract private key K1, the contract public key 370 of the contract certificate, an encryption parameter M3 of an OEM provisioning public key (prov. public key) 412 included in the OEM provisioning certificate (prov. certificate) 411, and an ephemeral DH public key K2 372 may be used. A data packet (CCDP) of the encrypted contract private key K1 may include a mobility account identifier (eMAID) corresponding to the EV user.

In other words, the contract private key 380 may be encrypted with an advanced encryption standard (AES) in a Galois/counter mode (GCM) having an authentication tag based on an elliptic-curve Diffie-Hellman (EDCH) shared secret key generated from the public key 412 of the OEM provisioning certificate 411. The ECDH shared secret key may correspond to the encryption parameter M3.

That is, the contract private key K1 to which the authentication tag is combined may be encrypted with the AES in the GCM mode based on the ECDH shared secret key generated from the public key 412 of the OEM provisioning certificate. The ECDH shared secret key may include an ephemeral DH public key K2 372 and an ephemeral DH secret key. The ephemeral DH secrete key or ephemeral DH private key (i.e., ephemeral Diffie-Hellman private key) corresponding to the ephemeral DH public key K2 372 may be separately prepared.

The eMSP 300 may use the root certificate 312 to create the contract certificate. The root certificate 312 is a root CA certificate of the eMSP, and this root CA certificate does not need to exist in the EVCC, but the CPS may need to process the contract certificate according to a preconfigured procedure.

In addition, the eMSP 300 may create the contract certificate and may generate a credential for the EVCC 10 including an encrypted contract certificate private key, that is, a key specifically encrypted for the EVCC 10. This credential may be stored in a specific message field (SignedInstallationData).

In addition, in order to distribute the contract certificate and the encrypted private key to the EVCC 100 through an online installation path via the SECC 200 of the EVSE, the eMSP 300 may deliver, to the CPS 390, a contract certificate data packet (CCDP) or a certificate installation package including the CDDP as a certificate installation response (CIR) message through a preconfigured communication channel of general B2B communication.

The CPS 390 may use its signature to give the correctness and reliability of the credential, and relay the signed message to the SECC 200. Here, the SECC 200 may compile the CIR (CertificateInstallationRes) message, and transmit it to the EVCC 100. In this case, the CPS is considered reliable, and thus the EVCC 100 does not need to verify the contract certificate received through the CIR message. The role of the aforementioned CPS 390 may be performed by the eMSP itself, an EVSE operator, or a stand-alone service provider, for example.

The above-described credential may include information such as a symmetric key previously shared by the eMSP 300 and the EVCC 100 or an ID that may be used to verify a physical or logical identity of the EVCC 100. In addition, the above-described credential may include a public key paired with the private key of the EVCC 100, or a public key certificate or certificate chain for the public key. The certificate chain may include a provisioning certificate chain. The provisioning certificate is a certificate used for one-time authentication through the EVCC 100, and after the authentication is completed, a CPS leaf certificate may be issued and installed for later authentication.

Meanwhile, if the eMSP 300 or SA provides multiple contract certificates based on different curves as defined by standards or regulations, the eMSP 300 or SA should deliver multiple different signed installation data (SignedInstallationData) containers to the SECC 200, and the EVCC 100 may import and install all different contract certificates by utilizing a looping mechanism for certificate installation request (certificateInstallationReq) messages at the discretion of the EV user.

On the other hand, the EVCC 100 may sign a body element of the certificate installation request message using the private key associated with the EV public key ('subjectPublicKey') of the OEM provisioning certificate 411.

In summary, in the above-described certificate installation method, a key of the recipient derives a static private key using an ephemeral-static DH key exchange protocol. The SA or eMSP may deliver a private key having a form of being encrypted using the derived session key to the EVCC 100. In an ephemeral-static variant of the DH protocol, the public key of the recipient, e.g., EVCC 100, is not changed. That is, it is static and already known to the sender, eMSP 300. However, the sender 300 may still use the ephemeral public key sent to the recipient. In this manner, both the sender and recipient may derive the same session key without a response message of the recipient. Since the SA uses the ephemeral key, the derived session key may vary for each instance (distribution) of the secret or private key.

The CPS 390 may also use a signature to assert the correctness and authenticity of the credential, and may relay a signed message fragment P2 to the SECC 200. The SECC 200 may compile a certificate installation response (CertificateInstallationRes) message received from the CPS 390, and deliver it to the EVCC 100. In this case, the CPS is considered trustworthy, and thus the EVCC 100 may not need to verify the contract certificate received through the certificate installation response message.

FIGS. 6 to 8 are diagrams for describing certificate installation related messages that can be employed in the certificate installation method of FIG. 5 in more detail.

In the certificate installation method according to the present exemplary embodiment, the EVCC may transmit a certificate installation request message signed with a private key associated with a manufacturer (OEM) provisioning certificate to a secondary actor, and may receive a certificate installation response message signed with a private key associated with a leaf certificate of the CPS from the secondary actor.

Here, the certificate installation response message generated by the secondary actor may include a contract certificate data packet including a signed installation data element. The signed installation data element may include a contract certificate chain element and an encrypted private ley element. The encrypted private key element may store a private key belonging to an encrypted new contract certificate for the EVCC without a TPM.

In addition, the private key belonging to the new contract certificate may be encrypted using the AES-GCM based on an encryption key generated from a public key of the manufacturer provisioning certificate and generated through the ECDH protocol. The private key encrypted using the AES-GCM may be included in an encrypted private key field of the contract certificate data packet as a 528-bit or 448-bit ciphertext after a 96-bit to 128-bit initialization vector (IV) at the beginning.

The secondary actor (SA) may be the eMSP or the MO. The AES is an algorithm that encrypts actual data, and the GCM refers to a scheme of preventing data from being guessed by combining blocks of the encrypted packet in block-based encryption.

Specifically, as shown in FIG. 6, the certificate installation request message type transmitted by the EVCC to the SA may include an attribute element including an ID, an OEM provisioning certificate chain, a list of root certificate IDs, maximum contract certificate chain (MaximumContractCertificateChain), and prioritized eMAIDs (PrioritizedEMAIDs) element.

The OEM provisioning certificate chain is an EV-related certificate chain consisting of an OEM provisioning certificate and OEM subordinate CA certificates previously installed by the OEM in the EVCC. The ID of the OEM provisioning certificate (i.e., provisioning certificate identifier (PCID)) may be used to identify a currently valid vehicle contract together with information stored in a specific SA corresponding to a partner of the contract. The PCID may also be used by the eMSP to identify the contract belonging to the related EV. This is possible when the EV user provides the PCID to the eMSP when creating the contract. To this end, the PCID may be generated as a short character string unique to the OEM that created the provisioning certificate, and may be included in the OEM provisioning certificate.

The OEM provisioning certificate may be encoded with distinguished encoding rules (DER). The OEM provisioning certificate itself, i.e., the public key, may later be used to encrypt the private key associated with the contract certificate in the certificate installation response (i.e., CertificateInstallationRes) message. Also, the PCID may be provided from the EV user to the SA through another communication channel.

In addition, the OEM provisioning certificate chain may include a certificate element and a sub-certificate (SubCertificates) element as sub-elements. Here, the certificate may refer to an x.509v3 certificate or a client certificate, and may be encoded in a DER format. The DER format may be used in encryption to create a unique serial numbered representation of data that should be digitally signed, such as X.509 certificate. The DER format enables the signature and verification of X.509 certificate. The sub-certificate refers to a chain of all subordinate certificates for a root certificate, not including the root certificate.

The root certificate identifier list (i.e., ListofRootCertificateIDs) may include certificate IDs of all V2G root CA certificates currently installed in the EVCC. These root certificates may be used by the EVCC to validate the SA certificate included in the certificate installation response (CertificateInstallationRes) message. In addition, the public key of the SA certificate included in the certificate installation response message may be used to verify a signature of the certificate installation response message.

The MaximumContractCertificateChain indicates the maximum number of contract certificate chains that the EV or EVCC of the EV intends to install at the corresponding time. It may be less than or equal to the maximum number of contract certificate chains that the EV can store in a memory. For example, when the EV can store 5 contract certificates and intends to install all of them, a parameter of the maximum number of the contract certificate chains may be set to 5. On the other hand, if the EV wants to install only three contract certificates, the EVCC may set the parameter of the maximum contract certificate chains to 3, and store up to 5 contract certificate chains.

In addition, when the SA has only two contract certificates available for the EV, even if the maximum number of contract certificate chains (MaximumContractCertificateChains) is larger than the number of contract certificates the SA owns for the corresponding EV, the number of contract certificates in the maximum contract certificate chain of the SA may be limited so that only two contract certificates available to the SA are provided to the EVCC. On the other hand, when the SA has 7 contract certificates and the EV sets a parameter of the maximum contract certificate chains to 3 and transmits by including it in the certificate installation request message, the SA may select only three contract certificates according to priorities preconfigured based on the prioritizedEMAIDs parameters, and provide them to the SECC.

The prioritized EMAIDs (PrioritizedEMAIDs) are elements selectively included in the corresponding message, and represent a list of the EMAIDs referring to contract certificates to be installed in the EV. In this case, the EMAIDs are listed in order of highest priority to lowest priority. The SA may use the parameters of the prioritized EMAIDs to filter out a list of contract certificates to be installed if the maximum number of contract certificate chains (i.e., MaximumContractCertificateChains) is less than the number of contract certificates available in the SA, and obtain the highest priority contract certificate desired by the EV.

When the PrioritizedEMAIDs parameter is omitted and the SA has contract certificates for EVs more than the maximum contract certificate chains the EV intends to install, indicated by the maximum contract certificate chain field in the certificate installation request (CertificateInstallationReq) message, the SA may send a contract certificate applicable to the corresponding EV selected by the SA according to the parameter of the maximum contract certificate chain.

In addition, as shown in FIG. 7, the certificate installation response message type received by the EVCC from the SA may include a header (not shown), a response code (ResponseCode), EVCC processing status, CPS certificate chain, signed installation data, and remaining contract certificate chains (RemainingContractCertificateChains) element.

The response code (ResponseCode) may indicate an approved status of a V2G message received by the SECC.

The processing status (EVSEProcessing) of the EVSE may optionally have parameter values indicating a finished status or an ongoing status. The parameter value 'Finished' may indicate that EVSE has completed the processing that started after sending the certificate installation request (CertificateInstallationReq) message. The parameter value 'Ongoing' may indicate that the EVSE is still processing the above-described processing at a time when the response message is transmitted from the SA.

The CPS certificate chain may be used for the EVCC to verify a signature of a message header received from the SA.

The remaining contract certificate chains may indicate whether the remaining contract certificate chains are installed. If a value of this element is greater than 0, the EVCC may install the remaining contract certificate chains.

The signed installation data includes all data types required for the above description.

That is, as shown in FIG. 8, the signed installation data type may include the contract certificate chain, encryption that the TPM supports (Encrypted for TPM), an elliptic curve Diffie-Hellman curve (ECDHCurve), a DH public key, an SECP521-encrypted private key (SECP521_EncryptedPrivateKey), X448-encrypted private key (X448_EncryptedPrivateKey), and TPM-encrypted private key (TPM_EncryptedPrivateKey).

The contract certificate chain is used for authentication of services being used by the EVSE in relation to automatic authentication of the EV user, EV charging, and charging amount payment.

The parameter 'Encrypted for TPM' is for the EVCC that supports the TPM. If the parameter is set to 'true', it may indicate that the SA has encrypted the contract certificate private key the for EVCC with a TPM. Accordingly, if the SA encrypts the contract certificate private key for the EVCC that does not support a TPM, the parameter is set to 'false'.

The EDCH curve may be an elliptic curve cryptography (ECC) curve that the eMSP is to use to generate a session key or seed used to encrypt the contract certificate private key. The ECC curve may include a cryptographic algorithm such as Elliptic Curve Digital Signature Algorithm (ECDSA) and Elliptic Curve Diffie-Hellman Ephemeral (ECDHE). This parameter may be set to 'SECP521' or 'X448'.

In more detail about this parameter, when the SA uses a first ECC curve designated in advance to generate an encryption key of the contract certificate private key through ECDHE, the SA may set the ECDHCurve parameter to 'SECP521'. In addition, when the SA uses a second ECC curve designated in advance to generate an encryption key for encrypting the contract certificate private key through ECDHE, the SA may set the ECDHCurve parameter to 'X448'.

The DH public key is used for the SA to encrypt a contract signing private key or the contract certificate private key and for the EVCC to decrypt it, and is a DH public key of the SA for the EVCC to generate a session key. The DH public key may have a length of up to 133 bytes, and the first byte thereof may have a fixed value of 0x04 indicating an uncompressed format. If the ECDHCurve is set to 'SECP521', the length of the DH public key may be 133 bytes, and if the ECDHCurve is set to 'X448', the length of the DH public key may be 57 bytes.

The SECP521-encrypted private key (SECP521_EncryptedPrivateKey) is a 521-bit private key belonging to the new contract certificate encrypted for the EVCC without a TPM.

The X448-encrypted private key (X448_EncryptedPrivateKey) is a 448-bit private key belonging to the new contract certificate encrypted for the EVCC without a TPM.

The TPM-encrypted private key (TPM_EncryptedPrivateKey) is a private key belonging to the new contract certificate encrypted for the EVCC with a TPM.

As described above, the contract certificate private key may be encrypted with a unique ECDHE key for every signed installation data packets delivered from the SA to the SECC. Changing the ECDHE key for each of every signed installation data packets that the SA delivers to the SECC means getting the exact same contract certificate using the exact same private key for a case where the EVCC delivers three consecutive certificate installation request (CertificateInstallationReq) messages for the same contract certificate and for three signed installation data within the certificate installation response (CertificateInstallationRes) message. However, the signed installation data should be unique in all the certificate installation response messages. To this end, the SA may receive a request from the SECC to provide signed installation data for a specific PCID, encrypt the contract certificate private key accordingly, and generate signed installation data on the fly.

According to the above configuration, security is improved, but since the eMSP already stores the OEM provisioning certificate public key, a slight delay may be added especially to responding to the certificate installation request (CertificateInstallationReq) message when a data packet is prepared. This delay may be chosen at the discretion of the system's SA or eMSP. However, in the present exemplary embodiment, it is not required to change the ECDHE key for each of all the signed installation data packets delivered from the SA.

In addition, the SA or eMSP may indicate a curve that it wants the CPS to use for the CPS certificate, which is used for signing a signed installation data field, to the CPS. This allows the CPS to use a certificate associated with the curve that the SA or eMSP wants to use to sign the specific signed installation data. This may help the SA or eMSP's assurance that the contract certificate is not rejected by the EVCC.

In addition, if the CPS's certificate related to the specific ECC curve is revoked, the SA or eMSP requests that the signed installation data field be signed with the certificate based on the ECC curve, but the CPS may optionally comply with the SA's or eMSP's request. That is, the CPS may have a certificate based on an ECC curve that can be used for signing the signed installation data. On the other hand, if the CPS does not have an ECC curve-based certificate, but the SA or eMSP requests additional signing of the signed installation data with an ECC curve-based certificate, the CPS may fail to comply with the request of the SA or eMSP. In this case, the CPS may respond non-compliance with the request.

FIGS. 9A and 9B are diagrams for describing encryption and decryption processes of an SECP521-based encrypted private key applicable to the certificate installation method of FIG. 5.

As shown in FIG. 9A, a 521-bit contract certificate private key corresponding to the contract certificate may be encrypted by the sender, that is, the SA or eMSP, using a session key derived from the ECDHE protocol.

The sender may apply the AES-GCM-256 algorithm for this encryption. The contract certificate private key is extended to 528 bits by padding with 7 leading zero bits so that an AES-GCM-256 can be applied. The explicit padding is necessary because the 521-bit private key is not byte-aligned.

That is, leading zeros may be included in the corresponding data element so that the length of the input data reaches a predefined length. If the length of a plaintext or private key is a multiple of a block size of the encryption algorithm being used, no padding for the plaintext or private key is required.

An initialization vector (IV) for this encryption should be randomly generated before the encryption, and should have at least a length of 96 bits as a sender-defined entropy.

Additional authenticated data (AAD) for this encryption may be calculated by concatenating the PCID received/used in the certificate installation request message to be a 18-byte string of uppercase letters and numbers without delimiters, encoding it into a decimal character string including uppercase letters and numbers, and concatenating it with a 16-byte SKI value of the contract certificate included in the certificate installation response message.

The byte order of all input data elements for the AES-GCM-256 encryption may be a big endian order.

That is, the outputs of the AES-GCM-256 encryption are a ciphertext and an authentication tag. The 528-bit ciphertext includes the 7-bit leading zeros and the 521-bit contract certificate private key ciphertext. The IV is transmitted in 12 bytes of the corresponding position in 12 most significant bytes of the encrypted private key using a specific ECC curve, that is, the SECP521_EncryptedPrivateKey field. In the SECP521_EncryptedPrivateKey field, a 66-byte ciphertext (Ciphertext), that is, the encrypted private key is written/placed after the IV. The tag is arranged to make up the 16 least significant bytes of the SECP521_EncryptedPrivateKey field.

If the aforementioned IV, leading zero bits, 521-bit contract certificate private key, and PCID and SKI values are encrypted through the AES-GCM-256 algorithm, the SA may generate a contract certificate data packet by concatenating the 528-bit ciphertext (encrypted leading zeros and private key) with the 128-bit authentication tag (abbreviated as 'tag'). The SA may deliver the contract certificate data packet to the CPS, and the CPS may deliver a second contract certificate data packet obtained by adding its signature to the contract certificate data packet (hereinafter referred to as 'first contract certificate data packet') to the SECC or to the EVCC via the SECC. The SECC may compile the second contract certificate data packet and transmit the first contract certificate data packet to the EVCC.

As shown in FIG. 9B, upon receiving the message or SECP521-encrypted private key within the message, the recipient or EVCC decrypts the contract certificate private key by using a session key derived from the ECDHE protocol and applying the AES-GCM-256 algorithm.

The recipient obtains the PCID and SKI by calculating the additional authentication data (AAD) before decryption. The PCID and SKI may be placed between the ciphertext and the tag.

The recipient reads the initialization vector (IV) from at least 12 most significant bytes of the SECP521_EncryptedPrivateKey field. The recipient reads the ciphertext, that is, the encrypted private key, from 66 bytes following the IV of the SECP521_EncryptedPrivateKey field. Then, the recipient reads the authentication tag from the 16 least significant bytes of the SECP521_EncryptedPrivateKey field.

When decrypting data using the AES-GCM-256 algorithm, an order of the data is important. The recipient verifies that the input data to the AES-GCM-256 decryption function/API conforms to a preconfigured form or format.

The recipient or EVCC verifies that the 7 most significant bits in the decrypted data are zeros, and then uses the 521 least significant bits as the 521-bit contract certificate private key. Upon receiving the contract certificate, the EVCC verifies whether the 521-bit private key received with the contract certificate is a valid 521-bit private key for the contract certificate. As a result of the verification, if the value of the 521-bit private key is strictly less than an order of reference points of a secp521r1 curve, and a key that matches the 521-bit public key of the contract certificate is generated by multiplying this value by the reference points, the EVCC or the recipient may determine that the 521-bit private key received together with the contract certificate is valid.

FIGS. 10A and 10B are diagrams for describing encryption and decryption processes of an X448-based encrypted private key applicable to the certificate installation method of FIG. 5.

Referring to FIG. 10A, a 448-bit contract certificate private key corresponding to the contract certificate is encrypted by the sender, that is, SA or eMSP, using a session key derived from the ECDHE protocol. The sender may apply the AES-GCM-256 algorithm for this encryption. The IV for this encryption is randomly generated before encryption and may have at least a length of 96 bits as a sender-defined entropy. In addition, additional authenticated data (AAD) for this encryption may be calculated in the same manner as the AAD of the 521-bit contract certificate private key.

The outputs of the above-described AES-GCM-256 encryption are a ciphertext and an authentication tag. A 448-bit ciphertext is the encrypted contract certificate private key.

That is, in the encryption of the 448-bit contract certificate private key, the IV is transmitted in the corresponding position and size in the 12 most significant bytes of the encrypted private key using a specific ECC curve, that is, the X448_EncryptedPrivateKey field. In the X448_EncryptedPrivateKey field, a 56-byte ciphertext, that is, the encrypted private key, is recorded next to the initialization vector (IV). The tag constitutes the 16 least significant bytes of the X448_EncryptedPrivateKey field.

As shown in FIG. 10B, when the recipient, that is, the EVCC, receives a certificate installation response message or the X448_EnlcryptedPrivateKey field in the message, the recipient or EVCC decrypts the contract certificate private key by using a session key derived from the ECDHE protocol and applying the AES-GCM-256 algorithm.

The recipient obtains the PCID and SKI by calculating the additional authentication data (AAD) before decryption. The 128-bit PCID and SKI, which are included in the AAD calculated by the EVCC, may be placed between the ciphertext and the tag.

The recipient reads the IV from bytes of a predetermined size among the 12 to 16 most significant bytes of the X448_EncryptedPrivateKey field. The recipient reads the ciphertext, i.e., the encrypted private key, from the 66 bytes following the IV of the X448_EncryptedPrivateKey field.

Then, the recipient reads the authentication tag from the 16 least significant bytes of the X448_EncryptedPrivateKey field.

When decrypting data using the AES-GCM-256 algorithm, an order of the data is important. The recipient may check whether the input data to the AES-GCM-256 decryption function/API conforms to a preconfigured form or format.

The recipient or EVCC uses the 448 least significant bits of the decrypted data as the 448-bit contract certificate private key. Upon receiving the contract certificate, the EVCC verifies whether the 448-bit private key received with the contract certificate is a valid 448-bit private key for the contract certificate. As a result of the verification, if the value of the 448-bit private key is strictly less than an order of reference points of an X448 curve, and a key that matches the 448-bit public key of the contract certificate is generated by multiplying this value by the reference points, the EVCC or the recipient may determine that the 448-bit private key received together with the contract certificate is valid.

In the above-described exemplary embodiment, the recipient or EVCC may verify whether the authenticated decryption function used to decrypt the data can use the 128-bit authentication tag (abbreviated as 'tag') as a second input. If decryption of the 521-bit private key, the 448-bit private key, or both fails, the recipient may reject the certificate installation response message as invalid.

FIG. 11 is a schematic block diagram of a certificate installation apparatus based on encryption and decryption of a contract certificate private key for an EVCC (hereinafter referred to simply as a 'certificate installation apparatus') according to another exemplary embodiment of the present disclosure. FIG. 12 is a block diagram of an AES-GCM core applicable to the certificate installation apparatus of FIG. 11.

As shown in FIGS. 11 and 12, the certificate installation apparatus may be implemented by the EVCC itself, a processor in the EVCC, and at least one core 110c in the processor.

The certificate installation apparatus corresponding to the EVCC 100 may include at least one processor 110 and a memory 120, and programs or instructions implementing the certificate installation method are stored in the memory 120. The programs or instructions may be read from the memory 120 according to operations of the processor 110 and loaded into the processor 110. The certificate installation apparatus may further include a communication interface (comm. I/F) 130.

The processor 110 may execute program instructions stored in the memory 120 or a separate storage device. The processor 110 may be implemented by at least one central processing unit (CPU), graphics processing unit (GPU), vehicle controller, or charging controller, or may be implemented by any other processor capable of performing the certificate installation method according to the present disclosure. An input interface, output interface, or input/output interface such as a keyboard, mouse, display device, touch screen, or voice input device may be connected to the processor 110.

The memory 120 may include, for example, a volatile memory such as read only memory (ROM) and a non-volatile memory such as random access memory (RAM). The memory 120 may load the program instructions stored in a storage device and provide the loaded program commands to the processor 110.

The memory 120 or separate storage device is a recording medium suitable for storing the program instructions and data, such as a magnetic medium such as a hard disk, floppy disk, and magnetic tape, an optical medium such as a compact disk read only memory (CD-ROM), digital versatile disk (DVD), a magneto-optical medium such as a floptical disk, or a semiconductor memory such as a flash memory, erasable programmable ROM (EPROM), or solid state drive (SSD) made based thereon.

The above-described memory 120 or storage device may store program instructions for controls, operations, and functions on a control block, an AES encryption block, a kind of algorithm for encrypting actual data, and a GCM block, a kind of method for preventing data extraction by combining blocks of an encrypted packet, which can be mounted on the processor.

In addition, program instructions stored in the memory 120 or the storage device may include program instructions for encrypting and/or decrypting a contract certificate private key, which may be employed in the certificate installation method according to the present disclosure. For example, the program instructions may include instructions for transmitting a certificate installation request message to the SA, instructions for receiving a certificate installation response message from the SA, instructions for verifying AAD from the received message, instructions for obtaining an IV from the received message, instructions for obtaining a 521-bit or 448-bit contract certificate private key from a ciphertext of the received message, instructions for verifying whether the obtained contract certificate private key is valid for a contract certificate received through the message, instructions for checking whether an authentication tag can be used as a second input, and instructions for rejecting the certificate installation response message as invalid when decryption of both the 521-bit private key and the 448-bit private key fails.

The communication interface 130 may include at least one communication subsystem for connecting the EVCC with the SECC in a power line communication scheme, or for connecting the EVCC with the SA such as CPS, eMSP, and MO through a communication network such as a short-distance wired/wireless network, mobile communication network, vehicle network, and satellite communication network.

Meanwhile, when the certificate installation apparatus is implemented by the processor 110 within the EVCC or at least one core 110c within the processor 110, as shown in FIG. 12, the certificate installation apparatus may include a control block 111, an AES crypto-block 112, and a GCM block 113 which are executed by the core 110c.

In addition, the certificate installation apparatus may have a first input unit 115 for inputting a key value into the AES crypto-block 112, a second input unit 116 for inputting a plaintext or ciphertext, initialization vector, and AAD into the GCM block 113, a first output unit 117 for outputting a ciphertext or plaintext from the GCM block 113, and a second output unit 118 for outputting a tag from the GCM block 113. The control block 111 may control the overall operations of the AES crypto-block 112 and the GCM block 113.

The AES crypto-block 112 may include a round block, key scheduler, and sub-control block, and a data path may have the length of 128 bits. When a 128-bit plaintext/ciphertext block is input, encryption/decryption thereof is performed in a specific operating mode using a 251-bit or 256-bit secret key. The AES crypto-block 112 may require more than 15 clock cycles due to the size of the 251-bit or 256-bit secret key, but the confidentiality of security may be improved.

The GCM block 113 has three 256-bit registers, two 32-bit registers, a finite field or Galois field multiplier 114, and an adder. When the AAD is input to the GCM block 113, a finite field multiplication operation may be performed on the AAD, and when a plaintext/ciphertext is input to the GCM block 113, the IV may be counted and transmitted to the AES block. Then, when a ciphertext/plaintext is input from the AES block 112, a finite field multiplication operation may be performed.

FIG. 13 is a schematic block diagram of a certificate installation apparatus according to another exemplary embodiment of the present disclosure.

As shown in FIG. 13, the certificate installation apparatus may be implemented by the SA, in particular, apparatus(es) executing the eMSP 300, MO, CPS, or a combination thereof.

The certificate installation apparatus corresponding to the eMSP 300 may include at least one processor 310, a memory 320, and a communication interface (comm. I/F) 330, and the memory 320 may store programs or instructions that implement the certificate installation method. The programs or instructions may be read from the memory 320 and loaded into the processor 310 according to operations of the processor 310.

The components of the certificate installation apparatus of the present exemplary embodiment may be substantially the same as the corresponding components of the certificate installation apparatus described above with reference to FIGS. 11 and 12, except for different installation place(s) or operating subject(s).

However, program instructions stored in the memory 320 or a separate storage device may include program instructions for encrypting and/or decrypting a contract certificate private key which are applicable to the certificate installation apparatus according to the present exemplary embodiment. For example, the program instructions may include instructions for receiving a certificate installation request message from the EVCC, instructions for transmitting a certificate installation response message to the SA, instructions for generating a data packet encrypting the contract certificate private key together with the contract certificate associated with the EVCC, instructions for determining the size of ciphertext suitable for a 521-bit key when generating the data packet, and the like.

Meanwhile, as described above, the apparatus and method according to the present disclosure may be implemented as computer-readable programs or codes on a computer-readable recording medium. The computer-readable recording medium may include all types of storage devices in which data that can be read by a computer system is stored. In addition, the computer-readable recording medium may be distributed to computer systems connected through a network to store and execute the computer-readable programs or codes in a distributed manner.

The computer-readable recording medium may include hardware devices specially configured to store and execute program instructions, such as ROM, RAM, and flash memory. The program instructions may include high-level language codes that can be executed by a computer using an interpreter or the like as well as machine codes generated by a compiler.

Some aspects of the present disclosure have been described above in the context of a device but may be described using a method corresponding thereto. Here, blocks or the device corresponds to operations of the method or characteristics of the operations of the method. Similarly, aspects of the present disclosure described above in the context of a method may be described using blocks or items corresponding thereto or characteristics of a device corresponding thereto. Some or all of the operations of the method may be performed, for example, by (or using) a hardware device such as a microprocessor, a programmable computer or an electronic circuit. In some embodiments, at least one of most important operations of the method may be performed by such a device.

In embodiments, a programmable logic device (e.g., a field-programmable gate array) may be used to perform some or all of functions of the methods described herein. In embodiments, the field-programmable gate array may be operated with a microprocessor to perform one of the methods described herein. In general, the methods are preferably performed by a certain hardware device.

While the present disclosure has been described above with respect to embodiments thereof, it would be understood by those of ordinary skill in the art that various changes and modifications may be made without departing from the technical conception and scope of the present disclosure defined in the following claims.

The invention claimed is:

1. A certificate installation method based on encryption and decryption of a contract certificate private key for an electric vehicle communication controller, the certificate installation method comprising:
   transmitting, by the electric vehicle communication controller and to a secondary actor, a certificate installation request message signed with a private key associated with a manufacturer provisioning certificate; and
   receiving, from the secondary actor, a certificate installation response message signed with a private key associated with a leaf certificate of a certificate provisioning service,
   wherein the certificate installation response message includes a contract certificate data packet including a signed installation data element, the signed installation data element includes a contract certificate chain element and an encrypted private key element, and the encrypted private key element stores a private key belonging to a new contract certificate encrypted for the electric vehicle communication controller without a trusted platform module,
   wherein the private key belonging to the new contract certificate is encrypted using an advanced encryption standard (AES)-Galois/counter mode (GCM) based on an encryption key which is generated from a public key of the manufacturer provisioning certificate and the private key of the secondary actor through elliptic-curve Diffie-Hellman (ECDH) protocol, and the private key encrypted using the AES-GCM is included as a ciphertext or an encrypted private key field in 528 bits or 448 bits following a 96-bit or 128-bit initialization vector (IV) in the contract certificate data packet, and
   wherein the initialization vector is included in the encrypted contract private key structure and is used as input to the AES-GCM decryption process together with the encryption key derived via ECDH, to decrypt the encrypted private key.

2. The certificate installation method according to claim 1, wherein the private key encrypted using the AES-GCM is encrypted with an AES-GCM-256 suitable for a cipher suite used in a transport layer security of the certificate installation response message.

3. The certificate installation method according to claim 1, wherein the contract certificate data packet further includes a tag of least significant 128 bits after the ciphertext.

4. The certificate installation method according to claim 3, wherein the tag includes additional authentication data in first 128 bits of a secure hash algorithm (SHA) including an SHA-256 or SHA-384 in connection with a provisioning certificate identifier and a mobility account identifier.

5. The certificate installation method according to claim 4, wherein the additional authentication data is calculated by:
concatenating the provisioning certificate identifier with 18-byte upper case letters and numbers without delimiters, the provisioning certificate identifier being used or received in the certificate installation request message; and
concatenating the concatenated provisioning certificate identifier with a value of a mobility account identifier or user key identifier of a contract certificate included in the certificate installation response message, which is encoded as a decimal character string including 16-byte uppercase letter and numbers.

6. The certificate installation method according to claim 1, wherein the contract certificate chain element includes certificate chain parameters used for authentication of a service being used in an electric vehicle supply equipment, and the certificate chain parameters store a certificate based on public keys of all subordinate certification authorities up to a root of a chain or the leaf certificate.

7. The certificate installation method according to claim 6, wherein the certificate or the leaf certificate is encoded in a distinguished encoding rules (DER) format as a client certificate.

8. The certificate installation method according to claim 1, wherein the signed installation data element further includes an elliptic-curve Diffie-Hellman (ECDH) curve parameter, the ECDH curve parameter represents a curve that the certificate provisioning service is to use for the leaf certificate of the certificate provisioning service used for signing the signed installation data element.

9. The certificate installation method according to claim 8, wherein the ECDH curve parameter is set to a SECP521 or X448 indicating a type of an ECDH curve.

10. The certificate installation method according to claim 9, wherein the private key encrypted using the AES-GCM is encrypted with different bit sizes according to a configuration of the ECDH curve.

11. The certificate installation method according to claim 1, wherein the signed installation data element further includes a Diffie-Hellman public key element, and the Diffie-Hellman public key element includes a subject public key or an alternate subject public key of the manufacturer provisioning certificate, or includes a static public key or an ephemeral public key of the secondary actor, which is used for the electric vehicle communication controller to generate a session key, so that the secondary actor encrypts the contract certificate private key and the electric vehicle communication decrypts the contract certificate private key.

12. The certificate installation method according to claim 11, wherein the subject public key, the alternate subject public key, the static public key, or the ephemeral public key is encoded in an uncompressed form and stored in the Diffie-Hellman public key element.

13. The certificate installation method according to claim 1, wherein the signed installation data element further includes a specific parameter EncryptedForTPM for the trusted platform module, and the specific parameter is set to 'false' indicating that there is no corresponding value or required value.

14. The certificate installation method according to claim 1, wherein the electric vehicle communication controller uses a big-endian order or a little-endian order for all bit strings and calculations of the certificate installation request message and the certificate installation response message.

15. The certificate installation method according to claim 1, wherein when receiving several different signed installation data containers from the secondary actor, the electric vehicle communication controller utilizes a looping mechanism for the certificate installation request message to receive, from the secondary actor, all different contract certificates encrypted for the electric vehicle communication controller without the trusted platform module, and installs the different contract certificates.

16. An apparatus for installing a certificate in an electric vehicle based on encryption and decryption of a contract certificate private key, the apparatus comprising:
a processor;
a memory storing instructions executable by the processor; and
a communication interface connected to the processor and communicating with an external apparatus through a network,
wherein the processor is configured to:
transmit, to a secondary actor, a certificate installation request message signed with a private key associated with a manufacturer provisioning certificate; and
receive, from the secondary actor, a certificate installation response message signed with a private key associated with a leaf certificate of a certificate provisioning service,
wherein the certificate installation response message includes a contract certificate data packet including a signed installation data element, the signed installation data element includes a contract certificate chain element and an encrypted private key element, and the encrypted private key element stores a private key belonging to a new contract certificate encrypted for an electric vehicle communication controller without a trusted platform module,
wherein the private key belonging to the new contract certificate is encrypted using an advanced encryption standard (AES)-Galois/counter mode (GCM) based on an encryption key which is generated from a public key of the manufacturer provisioning certificate and the private key of the secondary actor through elliptic-curve Diffie-Hellman (ECDH) protocol, and the private key encrypted using the AES-GCM is included as a 521-bit or 448-bit ciphertext in an encrypted private key field following a 96-bit or 128-bit initialization vector in the contract certificate data packet, and
wherein the initialization vector is included in the encrypted contract private key structure and is used as input to the AES-GCM decryption process together with the encryption key derived via ECDH, to decrypt the encrypted private key.

17. The apparatus according to claim 16, wherein the processor is configured to:
control an AES-GCM core that includes a control block, an AES crypto-block, and a GCM block, wherein the GCM block includes a finite field or Galois field multiplier to perform encryption or decryption based on the AES/GCM;
control a first input port for inputting a key value into the AES crypto-block;
control a second input port for inputting a plaintext/ciphertext, an initialization vector, and additional authentication data to the GCM block; and control a first output port for outputting a ciphertext/plaintext from the GCM block.

18. An apparatus for installing a certificate in an electric vehicle based on encryption and decryption of a contract certificate private key, the apparatus comprising:
   a processor;
   a memory storing instructions executable by the processor; and
   a communication interface connected to the processor and communicating with an external apparatus through a network,
   wherein the processor is configured to:
   receive, from an electric vehicle communication controller; a certificate installation request message signed with a private key associated with a manufacturer provisioning certificate; and
   transmit, to the electric vehicle communication controller, a certificate installation response message signed with a private key associated with a leaf certificate of a certificate provisioning service,
   wherein the certificate installation response message includes a contract certificate data packet including a signed installation data element, the signed installation data element includes a contract certificate chain element and an encrypted private key element, and the encrypted private key element stores a private key belonging to a new contract certificate encrypted for the electric vehicle communication controller without a trusted platform module,
   wherein the private key belonging to the new contract certificate is encrypted using an advanced encryption standard (AES)-Galois/counter mode (GCM) based on an encryption key which is generated from a public key of the manufacturer provisioning certificate and the private key through elliptic-curve Diffie-Hellman (ECDH) protocol, and the private key encrypted using the AES-GCM is included as a 521-bit or 448-bit ciphertext following a 96-bit or 128-bit initialization vector in the contract certificate data packet, and
   wherein the initialization vector is included in the encrypted contract private key structure and is used as input to the AES-GCM decryption process together with the encryption key derived via ECDH, to decrypt the encrypted private key.

19. The apparatus according to claim 18, wherein the processor is further configured to transmit the certificate installation response message to the electric vehicle communication controller, which includes a mobility operator (MO) or an e-mobility service provider (eMSP), and wherein a role of the certificate provisioning service is performed by the MO or the eMSP, an electric vehicle supply equipment operator, or a stand-alone service provider.

20. The apparatus according to claim 19, wherein the processor is configured to: unrecoverably delete or destroy, by the MO, the eMSP, and the certificate provisioning service, the contract certificate private key and the private key generated through the ECDH protocol.

* * * * *